United States Patent [19]

Lawson et al.

[11] Patent Number: 4,919,549

[45] Date of Patent: Apr. 24, 1990

[54] HYDROSTATIC SPINDLE

[75] Inventors: James L. Lawson, Simsbury; Ronald A. Peterson, Norfolk, both of Conn.

[73] Assignee: The Torrington Company, Torrington, Conn.

[21] Appl. No.: 303,371

[22] Filed: Jan. 30, 1989

[51] Int. Cl.$^5$ ............................................. F16C 32/06
[52] U.S. Cl. .................................... 384/113; 384/117; 384/119; 384/228; 384/331
[58] Field of Search ............... 384/113, 115, 117, 311, 384/312, 309, 306, 119, 228; 29/116.2

[56] References Cited

U.S. PATENT DOCUMENTS

| | | | |
|---|---|---|---|
| 1,900,874 | 3/1933 | Wallgren | 384/312 |
| 2,003,080 | 5/1935 | Janson | 384/312 |
| 4,035,038 | 7/1977 | Hinchcliffe et al. | 29/116.2 |

Primary Examiner—Lenard A. Footland
Attorney, Agent, or Firm—Frank S. Troidl

[57] ABSTRACT

The spindle has a sleeve about a fixed shaft. Swing-type bearing pads are attached to the fixed shaft. The bearing pads are lubricated by flowing a lubricant through primary and secondary lubricating holes located in the fixed shaft.

10 Claims, 6 Drawing Sheets

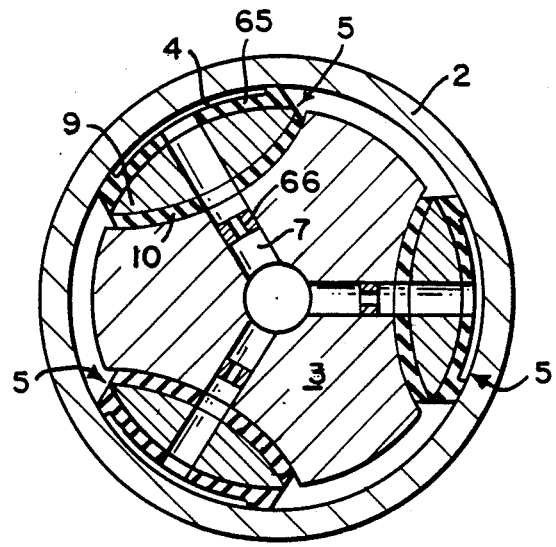
FIG. 9
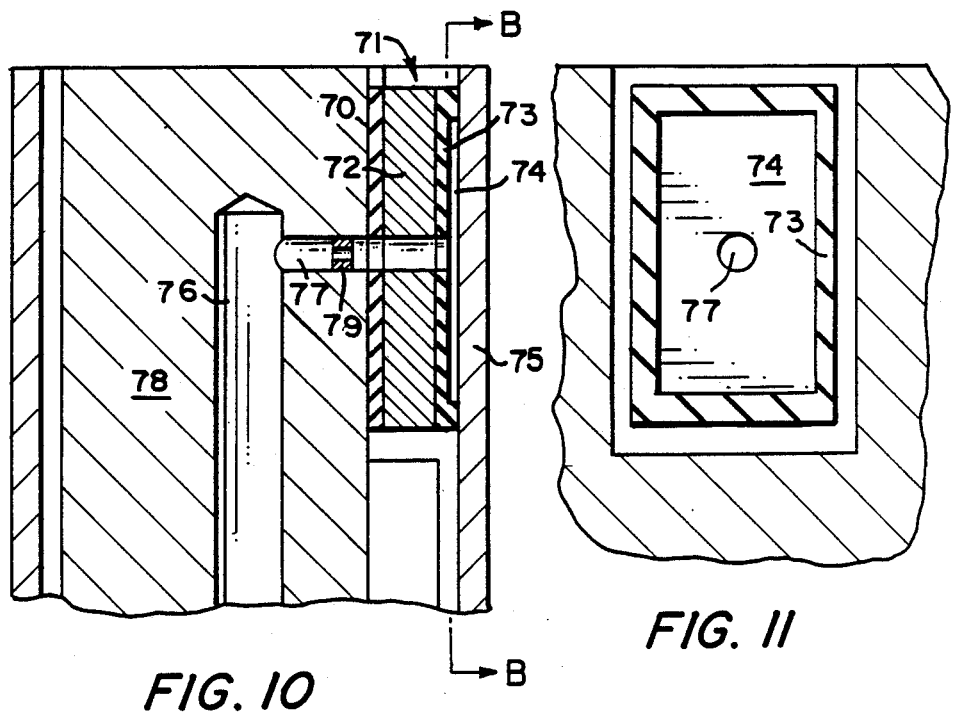
FIG. 10
FIG. 11

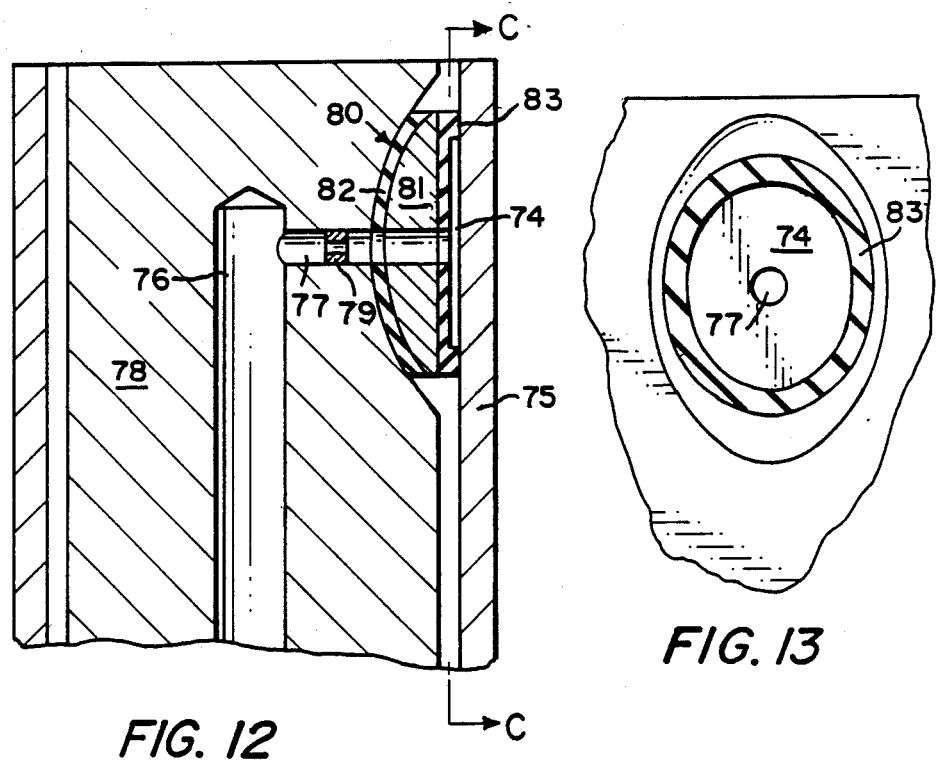
FIG. 12
FIG. 13
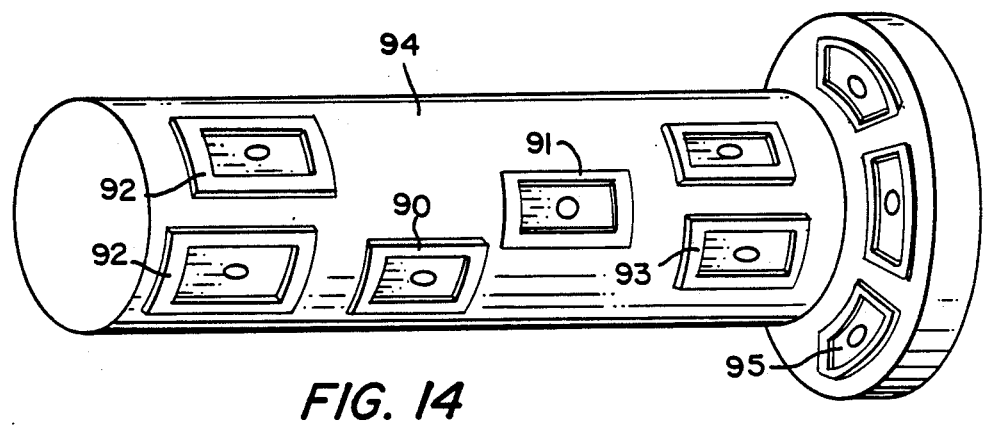
FIG. 14

HYDROSTATIC SPINDLE

BACKGROUND OF THE INVENTION

The present invention dramatically improves the speed of operation, load-carrying capability, and parasitic power consumption of spindles used in the textile industry for spinning and twisting yarn. This unique spindle comprises hydrostatic, self-lubricating, swing-type bearing pads disposed on a non-rotating shaft containing a lubricating means for introducing a lubricant between a rotating outer sleeve or shell and the bearing pads themselves.

Bearings may be classified broadly into three main categories: hydrodynamic sliding bearings, rolling bearings, and hydrostatic sliding bearings. Each of the aforementioned bearings have problems associated with load-carrying capacity, accuracy, lubricant requirements, friction, wear and fatigue.

Spindles used in the textile industry for spinning and twisting yarn typically employ rolling member bearings, usually ball bearings. Use of such bearings results in textile spindles with limited speed, load, and power capabilities. Furthermore, rolling member bearings are normally grease lubricated causing sealing and product contamination problems.

Rolling member bearings characteristically involve bearing surfaces which are capable of rolling on each other with a lubricant being disposed between the bearing surfaces. Rolling member bearings include inner and outer rings which are spaced apart to define an annular space which receives a plurality of rolling members.

Due to the desire to increase textile production, various attempts have been made to eliminate speed, load and power limitations. One method has made use of a high speed, high precision, low load-carrying spindle. Unfortunately, when these spindles are used to spin or twist heavy spools of yarn, they cause undesirable spindle vibrations and greatly increase power consumption. Elastomeric mounts have been used to dampen displacements caused by those spindle vibrations, however, lubricant eventually leaks past the mounts and contaminates the yarn. Thus, these high speed, high precision, low load-carrying spindles result in lubricant leaks, spoiled yarn, smaller than optimum spools, slower speeds, larger drive motors, increased air conditioning in the textile plant, and limits on the total number of spindles used per frame.

It is believed that the currently available spindles have been pushed to their upper productivity limits. The present invention provides an improved spindle which permits higher speeds, greater load-carrying capacity, and less power consumption. The spindle of the present invention overcomes the disadvantages of the aforementioned spindles by employing a novel hydrostatic, self-lubricating, swing-type bearing. This hydrostatic, self-lubricating, swing-type bearing provides internal-- dampening and a self-compensating means to allow minimum clearance and lubricant consumption.

One example of a hydrostatic, self-lubricating bearing is disclosed in U.S. Pat. No. 4,035,038 (Hinchcliffe et al), issued July 12, 1977. Hinchcliffe et al relates to rolling machines and, more particularly, to controlled deflection rolls comprising an inner non-rotative shaft having a roll shell journaled about it, the inner shaft having hydrostatic bearings directed against the inner surface of the roll shell.

The shaft according to Hinchcliffe et al contains an arrangement of pistons, the outer end of each comprising a hydrostatic bearing pad which supports the roll shell internally. Each hydrostatic bearing pad is comprised of a toroidally shaped member that is flexible and resilient. Each piston has a channel through which pressurizable fluid, usually oil, may pass into the body of the toroidal member and into the space between the toroid and the inner surface of the roll shell. A pressure drop of the fluid across the piston permits axial adjustment with respect to the piston and the roll shell. The pressurized fluid keeps the toroidal member inflated, and the fluid keeps the area of contact between the toroidal member and the inner surface of the roll shell well lubricated. The pressure drop and axial adjustment of the piston are self-correcting according to the load thereon. The piston design of Hinchcliffe et al is expensive in both mechanical design and lubricant consumption.

Various gas bearing guide rolls are set forth in U.S. Pat. No. 3,753,517 (Takenaka et al), issued Aug. 21, 1973; U.S. Pat. No. 4,030,784 (King et al), issued June 21, 1977; and U.S. Pat. No. 3,645,589 (Bird), issued Feb. 29, 1972.

Takenaka et al provides a guide roll for filaments as used in apparatuses in which the draw-twisting, draw-winding, false twisting or heat treatment of synthetic filaments and the like are carried out. The guide roll includes a fluid bearing, e.g., an air bearing, for high speed operation. A cylindrical roll body of the filament guide roll is rotably fitted to form a clearance between a shaft and the guide roll body. The shaft is provided with an air passage through its axial center for the introduction of the pressurized air, and branching from the air passage is provided in the shaft orifices from whence the pressurized air is introduced to the clearance to form therein an air film by which the roll body is supported about the shaft. This design may be suitable for guiding single filaments, but is unsatisfactory for carrying heavy loads, such as spools of yarn.

King et al relates to a gas supported or gas bearing roll shell assembly in which a roll shell is rotably carried on an axle which has an axial gas feed channel and, in the bearing zone of the roll shell, also has radial openings through which the compressed gas passes in a bearing gap between the axle and the inner wall of the roll shell which are especially useful as thread overrun rolls in textile machinery involving the high speed transport of threads, yarns or the like.

Bird also discloses an externally pressurized gas bearing roll shell which utilizes a permeable sleeve to distribute pressurized gas from a plenum to the load-carrying gas film.

The aforementioned air bearings are used as guide rolls in the twisting of single filaments and would not be capable of maintaining the speed and load-carrying requirements of spindles used for spinning or twisting yarn onto a textile spool. Furthermore, the vibrations caused by using such guide rolls would be disruptive to both the spindle and the textile machine.

The present invention overcomes the many disadvantages of the aforementioned spindles and guide rolls by providing a unique hydrostatic, self-lubricating, swing-type bearing about a non-rotating shaft of a spindle. Yarn contamination can also be avoided by using air as the lubricant in this novel spindle. Furthermore, the swing-type bearing pad design provides internal dampening and a self-compensating means to allow minimum clearance and lubricant consumption. The present inventors have developed a novel spindle for use in textile spinning, textile twisting, grinding and the like which produces enhanced speed and load-carrying capabilities. Also, by locating the bearing surfaces inside of the spool, the cantilevered or moment loads on the currently available bearings are greatly reduced. That is, disposition of the bearing inside of the spool will greatly shift the critical speeds upward.

Additional advantages of the present invention shall become apparent as described below.

SUMMARY OF THE INVENTION

Briefly described, the spindle comprises an outer sleeve and a non-rotating shaft disposed within the outer sleeve. Swing-type pads are disposed between the outer sleeve and the non-rotating shaft, the bearing pads being attached to the non-rotating shaft. Lubricating means for introducing a lubricant between the outer sleeve and the bearing pads are provided, the lubricating means comprising a primary lubricating hole disposed throughout the axial center of the non-rotating shaft and secondary lubricating holes disposed between the primary lubricating hole and the bearing pads, such that a lubricant may pass from the primary lubricating hole through the secondary lubricating holes to a clearance space formed between the outer sleeve and the bearing pads. The secondary lubricating holes may optionally be adapted with a means for restricting the flow of the lubricant so as to maintain a certain lubricating pressure between the outer sleeve and the bearing pads.

It is preferable that the swing-type bearing pads be metal-elastomer laminated structures. The metal layer may be either metal or metal covered with an elastomeric material. The elastomeric layer and elastomeric cover material may be formed from a material selected from the group consisting of: nitrile rubber, fluorocarbon rubber, natural rubber, and the like.

The metal layer of the swing-type bearing pad is attached to the elastomeric layer and the elastomeric layer is attached to the non-rotating shaft. The metal layer and non-rotating shaft are attached to the elastomeric layer by either bonding of a vulcanized elastomeric material at elevated temperatures under pressure or bonding them to the elastomeric layer by a chemical adhesive. Alternate pad materials may be plastic, ceramic, or composite.

The non-rotating shaft may have spherically shaped pockets disposed therein to receive the bearing pads. The elastomeric layer of the swing-type bearing pad is bonded to a spherically shaped surface of the metal layer. Optionally, the seat of the bearing pad may be either cylindrically or spherically shaped.

The bearing pads are disposed about the non-rotating shaft on at least two planar levels. There are at least three bearing pads disposed about the non-rotating shaft on each planar level. However, additional bearing pads may be disposed about the non-rotating shaft on different planar levels.

It is preferable that the lubricant be compressed air, although the following lubricants may also be acceptable: spindle oils, water, glycol solutions, any low viscous fluid, motor oil, or petroleum. Furthermore, the primary and secondary lubricating holes should be designed such that their diameters minimize the air pressure and air flow while capable of supporting the load and replenishing the air that escapes through the clearance space.

Thrust bearings containing tertiary lubricating holes connected to the primary lubricating hole are disposed about an end portion of the non-rotating shaft, such that they are in contact with one end of the outer sleeve for absorbing thrust loads therefrom. The spindle may be mounted on an isolation device, such as elastomeric bushings.

The present invention may also include many additional features which shall be further described below.

BRIEF DESCRIPTION OF THE DRAWINGS

FIG. 9 is a cross-sectional view of a hydrostatic spindle across line A—A of FIG. 1;

FIG. 10 is a cylindrically shaped seat for a swing-type bearing pad;

FIG. 11 is a cross-sectional view of a swing-type bearing pad across line B—B of FIG. 10;

FIG. 12 is a spherically shaped seat for a swing-type bearing pad;

FIG. 13 is a cross-sectional view of a swing-type bearing pad across line C—C of FIG. 12; and FIG. 14 is a front-top perspective view of another hydrostatic spindle according to the present invention.

DESCRIPTION OF THE PREFERRED EMBODIMENTS

Figure 1:
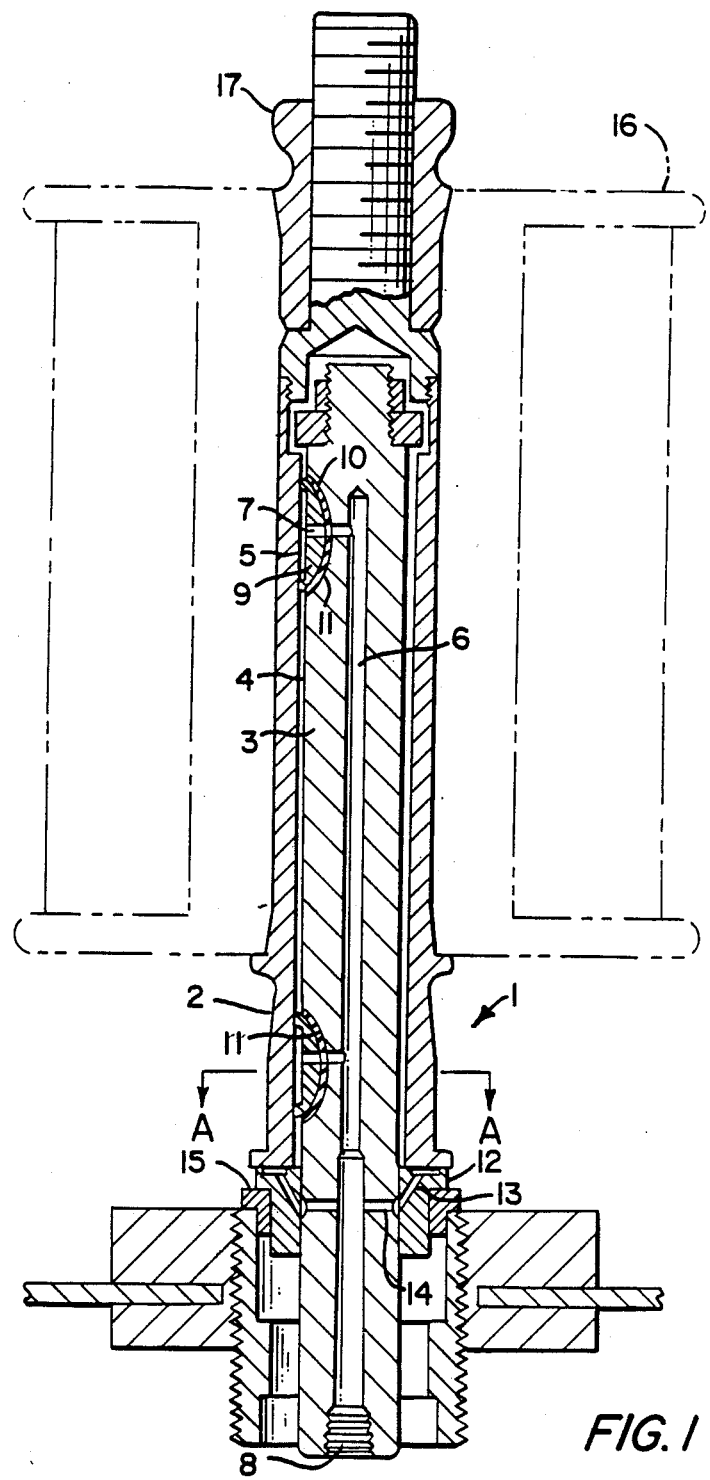
FIG. 1 is a schematic cross-sectional view of a spindle containing a hydrostatic, self-lubricating, swing-type bearing in accordance with the present invention.

The present invention provides a novel spindle which incorporates a unique hydrostatic, self-lubricating, swing-type bearing pad. This hydrostatic spindle may be used in the spinning and twisting of yarn in the textile industry, as a grinding spindle, or the like. It greatly enhances speed of operation, load-carrying capacity, and power efficiency. The swing-type bearing pads provide internal dampening and a self-compensating means to allow minimum clearance and lubricant consumption.

This hydrostatic spindle is a unique combination of a swing-type bearing, elastomeric coating on the bearing surface, and proper sizing of lubricant conduit restrictors. It operates at high speeds and will carry a relatively heavy load. The elastomeric layer of the swing-type bearing allows for somewhat eccentrically loaded packages to rotate about a non-rotating shaft with minimal vibrations.

Generally, this spindle has a rotating outer sleeve or shell with the external surface shaped as required to fit various size and shaped spools. The internal diameter of the outer sleeve is precision ground and forms the bearing surface for the bearing pads. There are typically two sets of bearing pads containing three pads per set disposed about a non-rotating shaft or axle. Each bearing pad is bonded on its spherically shaped backside to an elastomeric material and the elastomeric material, in turn, is bonded to a spherically shaped pocket of the non-rotating shaft. The design of the elastomer is such to give the proper amount of radial and tangential stiffness for correctly forming a lubricating wedge to carry load and provide dampening for the vibrations which are caused by high speed rotation.

The metal surface of the bearing pad, which is disposed opposite to the outer sleeve, is preferably coated with an elastomeric material. Furthermore, the seat of each bearing pad may optionally be cylindrically or spherically shaped.

The non-rotating shaft is disposed within the outer sleeve. Holes are drilled in the non-rotating shaft and bearing pads to allow compressed air or other lubricants to flow to the surface of each bearing pad creating a hydrostatic/hydrodynamic bearing. The lubricating holes are preferably adapted with a means for restricting the flow of the lubricant so as to maintain a certain lubricating pressure between the outer sleeve and bearing pads.

Thrust bearings may be disposed about one end of the non-rotating shaft and in contact with the lower end of the outer sleeve. The thrust bearings also contain holes to permit the flow of lubricant from the non-rotating shaft to the surface of each thrust bearing in contact with the outer sleeve.

Means are provided to connect the holes in the non-rotating shaft and bearing pads with a lubricant supply. Pressure and volume of the lubricant can be adjusted by a restriction means disposed within the lubricating holes.

The entire spindle is mounted on an isolation device, such as elastomeric bushings, in such a manner that any unbalanced forces cause the shaft, being of low mass, to consume most of the vibrational energy. Therefore, the spool and the machine itself experience very little vibration during normal operation.

Figure 2:
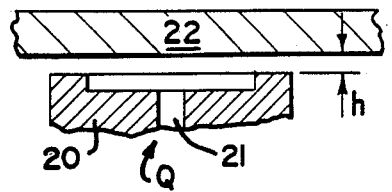
FIG. 2 is a schematic cross-sectional view of a conventional air-type bearing.
Figure 3:
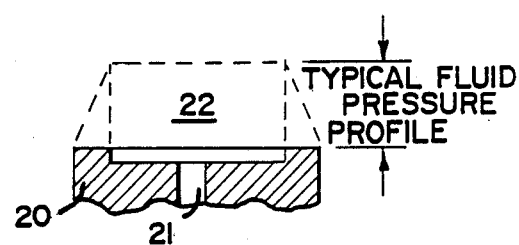
FIG. 3 is a schematic cross-sectional view showing the typical fluid pressure profile of a conventional air-type bearing.
Figure 4:
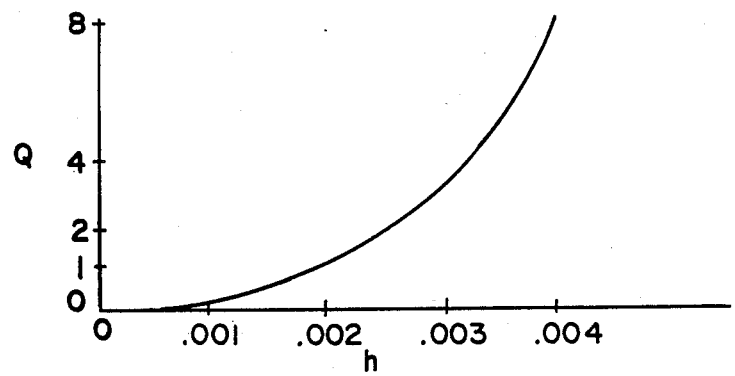
FIG. 4 is a graph which plots fluid flow rate (Q) versus clearance gap (h)

FIG. 2 attached hereto discloses a typical air-type bearing including air bearing 20 with air opening 21 for infusing air between bearing 20 and load 22. The major problems associated with the aforementioned conventional air bearings are difficulty and cost of manufacturing the bearings to the close tolerances required to maintain the small clearance h, and the ability to design the bearing such that thermal expansions do not alter clearance h. The size restriction of clearance h is necessary in order to avoid the expenditure of large amounts of lubricants (air) to support load 22. FIG. 3 demonstrates the typical fluid pressure profile on bearing 20. FIG. 4 graphically shows the relationship of fluid flow rate (Q) versus clearance gap (h), i.e., the air flow or fluid flow rate is generally proportional to the cube of clearance h.

The spindle of the present invention is described by referring to FIG. 1. FIG. 1 depicts a spindle 1 comprising an outer sleeve 2; a non-rotating shaft 3 disposed within outer sleeve 2; swing-type bearing pads 5 disposed between outer sleeve 2 and non-rotating shaft 3 such that a clearance space 4 exists between the surfaces of bearing pads 5 and the inner surface of outer sleeve 2, bearing pads 5 being attached to non-rotating shaft 3; and a lubricating means for introducing a lubricant into clearance space 4 via bearing pads 5, the lubricating means comprising primary lubricating hole 6 disposed throughout the axial center of non-rotating shaft 3 and secondary lubricating holes 7 disposed between primary lubricating hole 6 and bearing pads 5, such that a lubricant may pass from lubricant inlet 8 to primary lubricating hole 6 through secondary lubricating holes 7 to the surface of bearing pads 5 and eventually into clearance space 4.

Self-lubricating, swing-type bearing pads 5 are metal-elastomer laminated structures, wherein each bearing pad 5 contains a metal layer 9 and an elastomeric layer 10. Metal layer 9 may be either a metal or metal covered with an elastomeric material. Elastomeric layer 10 and elastomeric cover are formed from material selected from the group consisting of nitrile rubber, fluorocarbon rubber, natural rubber, and the like. Swing-type bearing pads 5 are similar to those described in U.S. Pat. No. 3,930,691 (Greene), issued Jan. 6, 1976, the teachings of which are incorporated herein by reference.

Metal layer 9 and non-rotating shaft 3 are attached to elastomeric layer 10 by either bonding of a vulcanized elastomeric material at elevated temperatures under pressure or bonding them by a chemical adhesive. Non-rotating shaft 3 has spherically shaped pockets 11 disposed about its surface to receive bearing pads 5.

Although bearing pads 5 are shown in FIG. 1 at two planar levels on non-rotating shaft 3, it is clearly contemplated herein that additional bearing pads 5 may be disposed at other planar levels as well. Furthermore, it is preferable that at least three bearing pads 5 be disposed about non-rotating shaft 3 at each planar level, although additional bearing pads 5 may be incorporated on any planar level as desired.

The lubricant which travels through primary lubricating hole 6 and secondary lubricating holes 7 may be one selected from the group consisting of: air, spindle oils, water, glycol solutions, any low viscous fluids, motor oil, and petroleum. Primary lubricating hole 6 and secondary lubricating holes 7 should have a diameter such that the pressure and flow rate of the lubricant, e.g., air, required to support the load and replenish the lubricant which escapes through clearance space 4 is kept at a minimum.

Thrust bearing 12 is disposed about one end of non-rotating shaft 3 such that it is in contact with the lower end of outer sleeve 2. Thrust bearing 12 contains tertiary lubricating holes 13 for lubrication of the surface of thrust bearing 12 which is in contact with outer sleeve 2. Tertiary lubricating holes 13 are connected with primary lubricating hole 6 via conduit 14.

Spindle 1 is mounted on an isolation device 15, such as an elastomeric bushing. Furthermore, in textile applications, a textile spool 16 is disposed about outer sleeve 2 in such a way that yarn may be spun or twisted onto spool 16 by rotation of outer sleeve 2. Spool 16 is secured onto spindle 1 via top screw 17.

As outer sleeve 2 is rotated by conveyer means, not shown in FIG. 1, to spin yarn about spool 16 a lubricant, such as compressed air, is supplied to primary lubricating hole 6 via lubricant inlet 8 from a lubricant source, not shown. The lubricant passes through primary lubricating hole 6 to secondary lubricating holes 7 and tertiary lubricating holes 13, and thereafter the lubricant passes out through the surfaces of bearing pads 5 and thrust bearings 12. Thus, as outer sleeve 2 rotates about non-rotating shaft 3 lubricant disposed in clearance space 4 protects bearing pads 5 from undue interaction and friction with rotating outer sleeve 2.

The design of swing-type bearing pads 5 is such that the proper amount of radial and tangential stiffness is generated to correctly form a lubricant wedge which carries load and provides dampening for vibrations caused from high speed rotation of outer sleeve 2 and spool 16. Pressure and volume of the lubricant are adjusted according to system need via restriction means, not shown, disposed within primary lubricating hole 6 and/or secondary lubricating holes 7.

Thrust loads are absorbed from outer sleeve 2 via thrust bearing 12. Spindle 1 is mounted on an isolation device 15 such that any unbalanced forces cause shaft 3, being of low mass, to consume most of the vibrational energy. Thus, the spool and the machine itself see very little vibrations permitting it to operate at higher speeds, carry greater loads, and reduce power consumption. Isolation device 15 allows the spool and material to rotate about its own true center of mass. It should be noted, however, that the true center rotation of this mass will not necessarily be the center of the bearing surface and, in fact, will probably change as the textile material is wound onto the spool.

Figure 5:
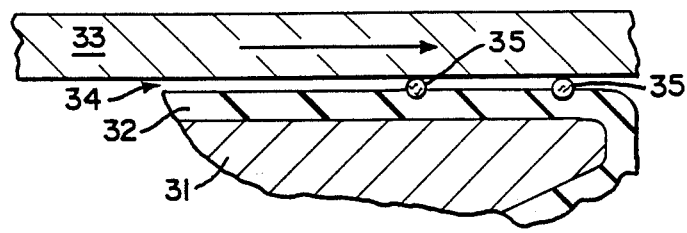
FIG. 5 is an elastomerically covered swing-type bearing pad in accordance with the present invention.

FIG. 5 shows a bearing pad 31 coated with an elastomeric material 32. Elastomeric material 32 is disposed between bearing pad 31 and outer sleeve 33, such that clearance space 34 is formed between elastomeric material 32 and outer sleeve 33. Application of elastomeric material 32 on the surface of bearing pad 31 allows the hydrostatic spindle to operate successfully even in the instance where small solid contaminants 35 enter clearance space 34. Elastomeric material 32 is capable of deflecting and passing over some of the peak asperities of outer sleeve 33. Some contact can occur without damage because of the low stress involved. Conventional bearings require a larger film thickness since contact with its outer sleeve must be avoided. Localized deflection by elastomeric material 32 of contaminants 35 limits the contact stress and prevents damage from smearing and abrasion. Conventional bearings require filtration of the lubricant and a thicker lubricant film in order to rid the system of contaminants which could damage the bearings due to high contact stresses.

Figure 6:
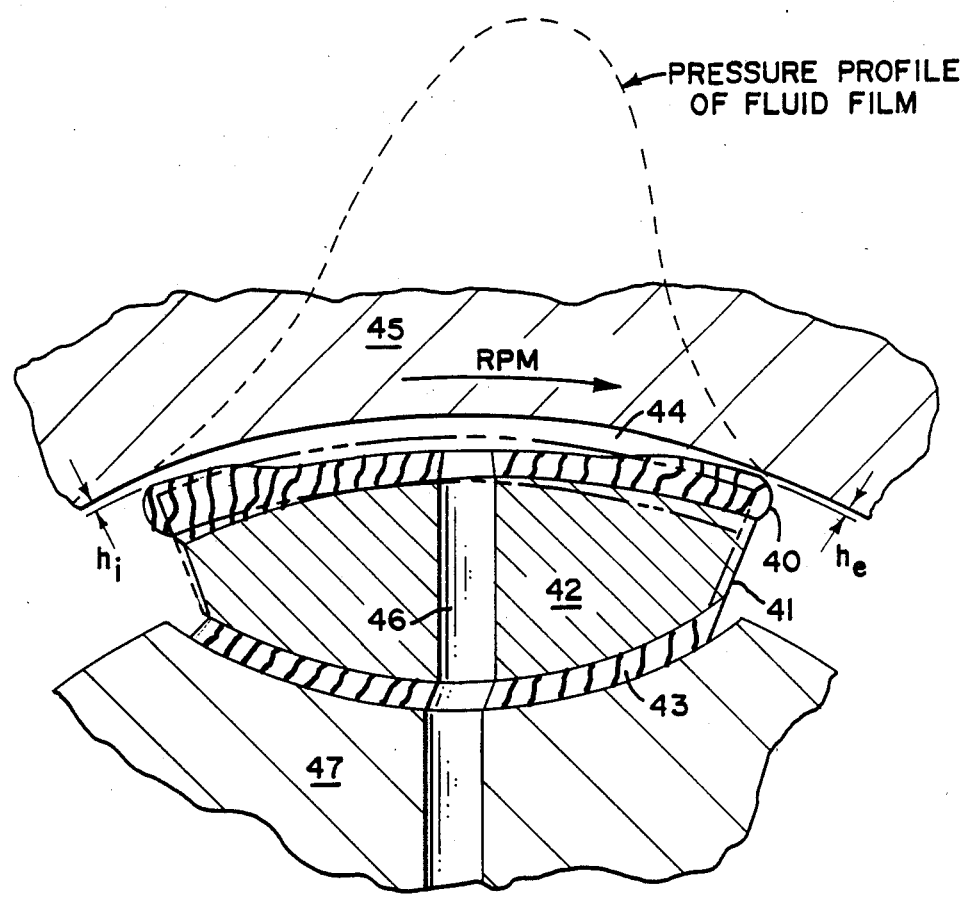
FIG. 6 is a schematic representation of a typical lubricant pressure profile on a swing-type bearing of the present invention.

FIG. 6 demonstrates how the distortion of elastomeric material 40 covering bearing pad 41, which includes metal layer 42 and elastomeric layer 43, reduces lubricant consumption by actually pinching clearance space 44 at its ends. The reduction in clearance space 44 is indicated by $h_i$ and $h_e$ formed between elastomeric material 40 and outer sleeve 45. The lubricant is fed into clearance space 44 via secondary lubricating hole 46 which traverses non-rotating shaft 47 and bearing pad 41.

The pressure and clearance space 44 are maintained by either a physical feed-back or a self-regulating system. In a single bearing pad system, for instance, a load is supported by a constant pressure at a constant clearance. If the load is reduced, then the clearance would increase and the pressure would drop. The pressure can be reduced further by adjustment of the restriction means in the lubricant delivery system, resulting in a corresponding reduction in the clearance. By adjusting the pressure to support a load at a constant clearance gap, this system may be operated with minimal lubricant consumption.

Figure 7:
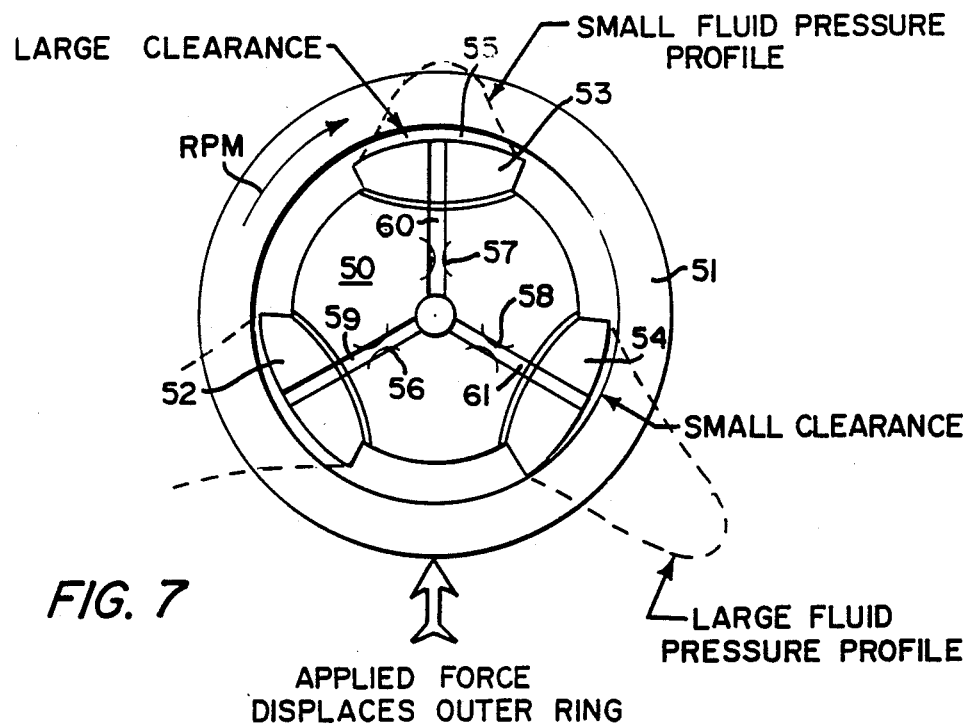
FIG. 7 is a cross-sectional view of a hydrostatic spindle according to the present invention demonstrating the effect of unequal forces being displaced on the various bearing pads.
Figure 8:
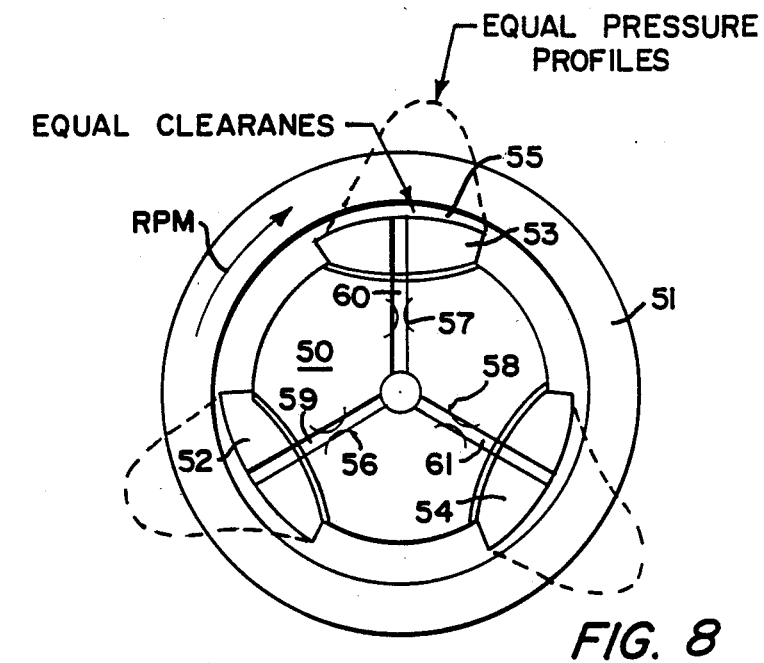
FIG. 8 is a cross-sectional view of a hydrostatic spindle of the present invention demonstrating the effect of equal forces being displaced on the various bearing pads.

When the above relationship is considered with a multi-pad bearing arrangement as shown in FIG. 7 and FIG. 8, having a non-rotating shaft and outer sleeve, the total system is in a self-regulating or feed-back condition. FIG. 7 demonstrates that since non-rotating shaft 50 and outer sleeve 51 can move relative to each other, an increase in pressure in any one bearing pad 52, 53, or 54 as a result of a corresponding decrease in clearance space 55 causes movement. As clearance space 55 near bearing pad 54 decreases and its pressure increases, the self-regulating system of this invention causes clearance space 55 to increase between bearing pads 52 and 53, and outer sleeve 51, and a drop in their pressures.

FIG. 8 demonstrates that when there is no displacement of outer sleeve 51 clearance space 55 is substantially similar at each bearing pad 52, 53, and 54. Therefore, it is clear that the hydrostatic spindle of the present invention operates in a condition of balanced forces, i.e., the applied load or the vector sum of the pressure profiles. The applied force, as shown in FIG. 7, causes a small displacement in clearance space 55. If restriction means 56, 57, and 58 are disposed within secondary lubricating holes 59, 60, and 61, respectively, the increase in size of clearance space 55 will cause a pressure drop and a smaller pressure profile in one bearing pad. In the other two bearing pads, the decrease in clearance space 55 will cause an increase in their respective pressure profiles. If the force is removed, as shown in FIG. 8, the pressure profiles will equalize and the displacement will return to zero.

The size or diameter of secondary lubricating holes 59, 60, and 61, are engineered such that lubricant pressure and flow rate are minimized while still being capable of supporting a load and replenishing the lubricant which escapes through clearance space 55.

FIG. 9 is a cross-sectional view along line A—A of the hydrostatic spindle shown in FIG. 1. This drawing demonstrates the relationship when three bearing pads 5 are disposed about non-rotating shaft 3. Although three bearing pads are shown herein, it is to be clearly understood that any combination of bearing pads are contemplated. Bearing pads 5 include metal layer 9, elastomeric layer 10, and preferably elastomeric material 65. A primary lubricating hole 6 is connected to secondary lubricating holes 7 to permit the passage of lubricant there-through and into clearance space 4. Secondary lubricating holes 7 preferably include a restriction means 66 to assist in regulating lubricant feed and pressure in clearance space 4 which is formed between bearing pads 5 and outer sleeve 2.

FIG. 10 shows an additional embodiment according to the present invention, wherein bearing pad 70 is formed such that its seat is cylindrically shaped. Bearing pad 70 includes metal layer 71, elastomeric layer 72, and elastomeric material 73. Lubricant is transported to a clearance space 74, formed between bearing pad 70 and outer sleeve 75, via primary lubricating hole 76 and secondary lubricating hole 77 disposed in non-rotating shaft 78. Restriction means 79 is disposed in secondary lubricating hole 77 to control the feed and pressure of the lubricant. The cylindrically shaped seat of bearing 70 can have a larger bearing surface area and thus support more load. However, cylindrically shaped seats will have less of an ability to conform to misalignment or tapering. FIG. 11 shows a cylindrically shaped bearing seat along line B—B of FIG. 10.

FIG. 12 describes a spherically shaped bearing seat in accordance with another embodiment of the present invention. Spherically shaped bearing pad 80 includes metal layer 81, elastomeric layer 82, and elastomeric material 83. The spherical shape of the bearing seat permits bearing pad 80 to self-align, conform to tapering, or conform to misalignment. However, since the bearing surface is smaller than a cylindrically shaped bearing seat it carries less of a load.

FIG. 13 shows a spherically shaped bearing seat along line C—C of FIG. 12.

FIG. 14 is another embodiment according to the present invention, wherein additional bearing pads 90 and 91 are disposed on different planar levels from bearing pads 92 and 93 about non-rotating shaft 94. These extra pads, 90 and 91, can be spaced randomly about non-rotating shaft 94 according to need. The additional bearing pads provide a hydrostatic spindle having more load carrying capacity. The extra pads will also bridge the minute imperfections or deviations from true roundness of the outer sleeve, not shown, and will, therefore, yield much less runout and/or a smoother rotating spindle. Also shown in FIG. 14 are thrust bearing pads 95.

While we have shown and described several embodiments in accordance with our invention, it is to be clearly understood that the same are susceptible to numerous changes and modifications apparent to one skilled in the art. Therefore, we do not wish to be limited to the details shown and described but intend to show all changes and modifications which come within the scope of the appended claims.

We claim:

1. A spindle comprising:
   an outer sleeve;
   a non-rotating shaft disposed within said outer sleeve;
   swing-type bearing pads made of metal-elastomer laminated structure containing a metal layer and an elastomeric layer disposed between said outer sleeve and said non-rotating shaft, said bearing pads being attached to said non-rotating shaft; and
   a lubricating means for introducing a lubricant between said outer sleeve and said bearing pads, said lubricating means comprising a primary lubricating hole disposed in said non-rotating shaft and secondary lubricating holes disposed between said primary lubricating hole and said bearing pads, such that a lubricant may pass from said primary lubricating hole through said secondary lubricating holes to a clearance space formed between said outer sleeve and said bearing pads.

2. The spindle according to claim 1, wherein thrust bearings containing tertiary lubricating holes are disposed about an end portion of said non-rotating shaft and in contact with said outer sleeve.

3. The spindle according to claim 1, wherein said metal layer is either metal or metal covered with an elastomeric material.

4. The spindle according to claim 3, wherein said elastomeric layer and elastomeric material are formed from a material selected from the group consisting of: nitrile rubber, fluorocarbon rubber, and natural rubber.

5. The spindle according to claim 1, wherein said metal layer and said non-rotating shaft are attached to said elastomeric layer by either bonding of a vulcanized elastomeric material at elevated temperatures under pressure or bonding them to said elastomeric layer by an adhesive.

6. The spindle according to claim 1, wherein said non-rotating shaft has spherically shaped pockets disposed therein to receive said bearing pads.

7. The spindle according to claim 1, wherein said bearing pads are disposed about said non-rotating shaft on at least two planar levels.

8. The spindle according to claim 7, wherein there are at least three bearing pads disposed about said non-rotating shaft on each planar level.

9. The spindle according to claim 1, wherein said spindle is mounted on an elastomeric bushing isolation device.

10. The spindle according to claim 1, wherein said bearing pads have seats which are either spherically or cylindrically shaped.

* * * * *